United States Patent [19]

Hormadaly

[11] Patent Number: 5,122,302
[45] Date of Patent: Jun. 16, 1992

[54] THICK FILM NTC THERMISTOR COMPOSITIONS

[75] Inventor: Jacob Hormadaly, Wilmington, Del.

[73] Assignee: E. I. Du Pont de Nemours and Company, Wilmington, Del.

[21] Appl. No.: 767,845

[22] Filed: Sep. 30, 1991

[51] Int. Cl.$^5$ .............................. H01B 1/08
[52] U.S. Cl. ...................... 252/518; 501/17
[58] Field of Search ............ 252/518, 521; 501/17, 501/18, 20

[56] References Cited

U.S. PATENT DOCUMENTS

| | | | |
|---|---|---|---|
| 4,539,223 | 9/1985 | Hormadaly | 427/102 |
| 4,651,126 | 3/1987 | Kumar et al. | 338/309 |
| 4,906,406 | 3/1990 | Hormadaly | 252/519 |
| 5,036,027 | 7/1991 | Watanabe et al. | 501/96 |

Primary Examiner—William R. Dixon, Jr.
Assistant Examiner—Chris Gallo

[57] ABSTRACT

Thick film thermistor paste comprising an admixture of finely divided particles consisting essentially of a) a conductive phase consisting of (1) at least one oxide of a platinum group metal having a positive TCR, and (2) $Co_2RuO_4$, b) an inorganic binder having a Dilatometer softening point of 450°–750° C. which contains transition metal oxides and is free of alkali metal oxides, c) a filler selected from vitreous silica, zircon and mixtures thereof, all of (a) through (c) being dispersed in, d) an organic medium.

8 Claims, No Drawings

THICK FILM NTC THERMISTOR COMPOSITIONS

FIELD OF THE INVENTION

The invention is directed to thick film thermistor compositions and particularly to those having negative thermal coefficients of Resistance.

BACKGROUND OF THE INVENTION

Thermistors are thermally sensitive resistors which have a large temperature coefficient of resistance. They are of two kinds. The first kind exhibits a positive change in resistance with increasing temperature (PTC) and the second kind exhibits a negative change in resistance with increasing temperature (NTC). NTC thermistors ordinarily consist of sintered semiconductive materials and can be used to make elements having resistance values of 10 to 1,000,000 ohms at room temperature. The operational range of such thermistors extends from 75 to 1275K. Therefore, they find extensive use as temperature sensors.

Thermistors are, however, used extensively for such other applications as an electronic time delay, capacitor, inductor in low frequency oscillators, surge suppressor, voltage or current limiter, gas pressure sensor, thermoconductivity detector, liquid or gas flow sensor and solid or liquid level indicator.

In whatever application they are used, it is essential that the thermistor have the following properties: (1) large temperature coefficient of resistance (TCR); (2) large range of available resistance values; (3) capability of operation with solid, liquid or gaseous environment over a reasonable temperature range; (4) adaptable to variety of sizes and shapes; and (5) ability to withstand mechanical and electrical stresses.

SUMMARY OF THE INVENTION

A thick film resistor paste comprising an admixture of finely divided particles consisting essentially, based on the total weight of the solids, of;

A. 20-60% weight of a conductive phase consisting essentially of (1) at least one oxide of a platinum group metal having a positive TCR and (2) $Co_2RuO_4$ in which the ratio of (1) to (2) is from 0.03 to 0.25;

B. 75-20% weight of an inorganic binder having a softening point below 700° C., which is free of alkali metal oxides and contain 1-10 mole % oxides(s) of transition metals having atomic numbers 22 to 28, 41, 42 and 74;

C. 5-20% weight filler selected from vitreous silica, zirconia and mixtures thereof, all of A, B, and C being dispersed in;

D. an organic medium.

DETAILED DESCRIPTION OF THE INVENTION

Conductive Phase

The conductive phase of the thick film compositions of the invention consists of a mixture of platinum group metal oxides and cobalt ruthenate ($Co_2RuO_4$). The platinum group metal oxides suitable for use in the practice of the invention are the oxides of Ru, Ir, Os, Rh and mixtures thereof which have TCR values of at least zero. Such oxides may be binary or polynary, but they must not be semiconductive.

The conductive phase materials should constitute at least 20% weight of the total solids in the composition, but no more than 60% weight. If less than 20% is used, the resistance values tend to be too high and if more than 60% weight conductive phase materials are used, the solids will not sinter properly.

The relative amounts of platinum group metal oxide(s) and cobalt ruthenate are, however, important. In particular, the weight ratio of metal oxide to cobalt ruthenate should be within the range of 0.03 to 0.5. If this ratio falls below 0.03, the resultant compositions tend to have too high resistance and low negative TCR values. On the other hand, if the ratio exceeds 0.5, the resultant compositions tend to have too low resistance and positive TCR values. It will, of course, be realized that mixtures of the platinum group metal oxides may be used as well as the individual oxides.

Particularly preferred platinum group metal oxides for use in the invention are ruthenium-based oxides such as $RuO_2$ and pyrochlore-like polynary oxides of Ru such as lead bismuth ruthenate.

The cobalt ruthenate material will ordinarily be used at a concentration above 15% by weight of the composition solids. Concentrations of 30 to 60% and especially 30 to 50% are preferred.

It is preferred that the cobalt ruthenate have a high surface area since the material is more efficient in its function. A surface area of at least 0.5 $m^2$/gm is preferred. Typically, the $Co_2RuO_4$ material used in the invention has a surface area of about 0.8 $m^2$/gm.

Cobalt ruthenante is made quite simply by (1) firing an aqueous dispersion of $CO_3O_4$ and $RuO_2$, (2) drying the dispersion and then (3) firing the dried dispersion in air at a temperature of at least about 850° C. to form the cobalt ruthenate.

It will ordinarily be preferred to use approximately stoichiometric amounts of the $CO_3O_4$ and $RuO_2$. However, small excesses of the $RuO_2$ are not at all harmful to the effectiveness of the cobalt ruthenate material. It should be noted that when the reaction is carried out in an alumina vessel, a small amount of $CoAl_2O_4$ may be formed. However, this can easily be avoided by using a reaction vessel made of platinum or other more inert material.

As is the case for the ruthenate component of the invention, the particle size of the cobalt ruthenate is not narrowly critical, but should be of size appropriate to the manner in which the composition is applied.

Inorganic Binder

The glass frits used as binder for the resistance materials of the invention are amorphous glasses having a Dilatometer softening point of 450°-750° C. containing minor amounts of transition metal oxides, but no substantial amounts of alkali metal oxides. As used herein, the term "transition metal" refers to those metals having atomic numbers of 22-28, 41, 42, and 74. Specifically, these metals are Ti, V, Cr, Mn, Fe, Co, Ni, Nb, Mo, and W.

Except for the preferred exclusion of alkali metal oxides, and the inclusion of the transition metal oxides, the composition of the glass binder is not by itself critical so long as the physical properties of the inorganic binder are appropriate. Thus, a wide variety of oxide glasses containing convention glass-forming and glass modifying components can be used so long as they meet the above criteria. they may be either crystallizing or non-crystallizing when the invention compositions are fired at 800°-950° C. in air. Particularly preferred are borosilicate glasses such as lead borosilicate, lead aluminoborosilicate and the like. Though the glasses must be free of alkali metals, they can and frequently will contain alkaline earth metal oxides as well as the above-referred transitions metal oxides.

It will be noted that the glasses for use in the invention may contain quite small amounts of alkali metal oxides, for example no more than about 3 mole %, without appreciably changing the essential properties of the composition of the invention. Nevertheless, it is preferred that the glass binders used contain no more than would be expected to be present as impurities, i.e., less than 1%.

The amount of transition metal oxides contained in the glasses for use in the invention can range from 1-10 mole percent for any of the above-referred transition metal oxides and preferably 2-7%. In some instances, higher amount can be used, especially in the case of $MnO_2$ which can be used in concentrations as high as 20 mole % without incurring any significant detrimental effect on the properties of the glass.

While the glass to be used in the invention may have a softening point of 450°-750° C., it is preferred that softening point of the glass range from 500°-700° C.

The total amount of inorganic binder in the composition of the invention is in part of a function of the desired thermistor properties. In other words, compositions having very high resistance will contain more glass than compositions having lower resistance values. In general, however, the amount of glass will be from 20 to 75% weight of the total solids.

The particle size of the inorganic binder is not particularly critical. However, the glass particles should be in the range of 0.1-10 microns (preferably 0.5-5 microns) and preferably have an average particle size of 2-3 microns. Glass fines below 0.1 micron have so much surface areaa that too much organic medium is needed to obtain the proper rheology of the paste for printing. On the other hand, if the particles are larger than 10 microns, they are likely to interfere with screen printing.

The glasses are prepared by conventional glass-making techniques, by mixing the desired components in the desired proportions and heating the mixture to form a melt. As is well-known in the art, heating is conducted to a peak temperature and for a time such that the melt becomes entirely liquid and homogeneous. In the present work, the components are premixed by shaking in a polyethylene jar with plastic balls and then melted in a platinum crucible at the desired temperature. the melt is heated as the peak temperature for a period of 11½ hours. The melt is then poured into cold water. The maximum temperature of the water during quenching is kept as low as possible by increasing the volume of water to melt ratio. The crude frit after separation from water, is freed from residual water by drying in air or by displacing the water by rinsing with methanol. The crude frit is then ball-milled for 3-5 hours in alumina containers using alumina balls.

After discharging the milled frit slurry from the mill, the excess solvent is removed by decantation and the frit powder is air-dried at room temperature. The dried powder is then screened through a 325 mesh screen to remove any large particles.

Filler

A still further essential component of the compositions of the invention are the fillers which are needed in order to assure the durability and and strength of the fired layers. The fillers which can be used in the invention are vitreous silica ($SiO_2$), zircon ($ZrSiO_4$) and mixtures thereof. At least 5% weight of either or both fillers must be used in order to obtain adequate technical effect. However, it is preferred to use not more than 20% weight, lest the viscosity of the composition during firing be too high to allow adequate glass flow. Though either can be used by itself, it is preferred to use a mixture of both fillers in concentrations of 5-15%, basis weight total filler.

Organic Medium

The inorganic particles are mixed with an essentially inert liquid medium (vehicle) by mechanical mixing (e.g., on a roll mill) to form a paste-like composition having suitable consistency and rheology for screen printing. The latter is printed as a "thick film" on conventional dielectric substrates in the conventional manner.

Any inert liquid may be used as the vehical. Various organic liquids, with or without thickening and/or stabilizing agents and/or other common additives, may be used as the vehicle. Exemplary of organic liquids which can be used are the aliphatic alcohols, esters of such alcohols, for example, acetates and propionates, terpenes such as pine oil, terpineol and the like, solutions of resins such as the polymethacrylates of lower alcohols, and solutions of ethyl cellulose in solvents such as pine oil, and the monobutyl ether of ethylene glycol monoacetate. A preferred vehicle is based on ethyl cellulose and beta terpineol. The vehicle may contain volatile liquids to promote fast setting after application to the substrate.

The ratio of vehicle to solids in the dispersions can vary considerably and depends upon the manner in which the dispersion is to be applied and the kind of vehicle used. Normally to achieve good coverage the dispersions will contain complementally, 60-90% solids and 40-10% vehicle. The compositions of the present invention may, of course, be modified by the addition of other materials which do not affect its beneficial characteristics. Such formulation is well within the skill of the art.

The pastes are conveniently prepared on a three-roll mill. The viscosity of the pastes is typically within the following ranges when measured on a Brookfield HBT viscometer at low, moderate and high shear rates:

| Shear Rate (Sec.$^{-1}$) | Viscosity (Pa · s) | |
| --- | --- | --- |
| 0.2 | 100–5000 | |
| | 300–2000 | Preferred |
| | 600–1500 | Most Preferred |
| 4 | 40–400 | |
| | 100–250 | Preferred |
| | 140–200 | Most Preferred |
| 384 | 7–40 | |
| | 10–25 | Preferred |
| | 12–18 | Most Preferred |

The amount of vehicle utilized is determined by the final desired formulation viscosity.

Formulation and Application

In the preparation of the composition of the present invention, the particulate inorganic solids are mixed with the organic carrier and dispersed with suitable equipment, such as a three-roll mill, to form a suspension, resulting in a composition for which the viscosity will be in the range of about 100–150 pascal-seconds at a shear rate of 4 sec$^{-1}$.

In the examples which follow, the formulation was carried out in the following manner:

The ingredients of the paste, minus about 5% organic components equivalent to about 5% weight, are weighed together in a container. The components are then vigorously mixed to form a uniform blend; then the blend is passed through dispersing equipment, such as a three roll mill, to achieve a good dispersion of particles. A Hegman gauge is used to determine the state of dispersion of the particles in the paste. This instrument consists of a channel in a block of steel that is 25 μm deep (1 mil) on one end and ramps up to 0″ depth at the other end. A blade is used to draw down paste along the length of the channel. Scratches will appear in the channel where the agglomerates' diameter is greater than the channel depth. A satisfactory dispersion will give a fourth scratch point of 10–18 typically. The point at which half of the channel is uncovered with a well dispersed paste is between 3 and 8 typically. Fourth scratch measurement of >20 μm and "half-channel" measurements of >10 μm indicate a poorly dispersed suspension.

The remaining 5% consisting of organic components of the paste is then added, and the resin content is adjusted to bring the viscosity when fully formulated to between 140 and 200 Pa.s at a shear rate of 4 sec$^{-1}$. The composition is then applied to a substrate, such as alumina ceramic, usually by the process of screen printing, to a wet thickness of about 3–80 microns, preferably 35–70 microns, and most preferably 40–50 microns. The electrode compositions of this invention can be printed onto the substrates either by using an automatic printer or a hand printer in the conventional manner, preferably automatic screen stencil techniques are employed using a 200 to 325 mesh screen. The printed pattern is then dried at below 200° C., about 150° C., for about 5–15 minutes before firing. Firing to effect sintering of both the inorganic binder and the finely divided particles of metal is preferably done in a well ventilated belt conveyor furnace with a temperature profile that will allow burnout of the organic matter at about 300°–600° C., a period of maximum temperature or about 800°–950° C. lasting about 5–15 minutes, followed by a controlled cooldown cycle to prevent over-sintering, unwanted chemical reactions at intermediate temperatures or substrate fracture which can occur from too rapid cooldown. The overall firing procedure will preferably extend over a period of about 1 hours, with 20–25 minutes to reach the firing temperature, about 10 minutes at the firing temperature, and about 20–25 minutes in cooldown. In some instances, totally cycle times as short as 30 minutes can be used.

Sample Preparation

Samples to be tested for Temperature Coefficient of Resistance (TCR) are prepared as follows:

A pattern of the resistor formulation to be tested is screen printed upon each of ten coded Alsimag 614 1×1″ ceramic substrates, and allowed to equilibrate at room temperature and then dried at 150° C. The mean thickness of each set of dried films before firing must be 22–28 microns as measured by a Brush Surfanalyzer. The dried and printed substrate is then fired for about 60 minutes using a cycle of heating at 35° C. per minute to 850° C., dwell at 850° C. for 9 to 10 minutes and cooled at a rate of 30° C. per minute to adhesion temperature.

Resistance Measurement and Calculations

The test substrates are mounted on terminal posts within a controlled temperature chamber and electrically connected to a digital ohm-meter. The temperature in the chamber is adjusted to 25° C. and allowed to equilibrate after which the resistance of each substrate is measured and recorded.

The temperature of the chamber is then raised to 125° C. and allowed to equilibrate, after which the resistance of the substrate is again measured and recorded.

The temperature of the chamber is then cooled to $-55°$ C. and allowed to equilibrate and the cold resistance measured and recorded.

The hot and cold temperature coefficients of resistance (TCR) are calculated as follows:

$$\text{Hot } TCR = \frac{R_{125° C.} - R_{25° C.}}{R_{25° C.}} \times (10,000) \text{ ppm/°C.}$$

$$\text{Cold } TCR = \frac{R_{-55° C.} - R_{25° C.}}{R_{25° C.}} \times (-12,500) \text{ ppm/°C.}$$

The values of $R_{25° C.}$ and Hot and Cold TCR are averaged and $R_{25° C.}$ values are normalized to 25 microns dry printed thickness and resistivity is reported as ohms per square at 25 microns dry print thickness. Normalization of the multiple test values is calculated with the following relationship:

$$\text{Normalized Resistance} = \frac{\text{Avg. measured resistance} \times \text{Avg. dry print thickness, microns}}{25 \text{ microns}}$$

TEST PROCEDURES

Coefficient of Variance

The coefficient of Variance (CV) is a function of the average and individual resistances for the resistors tested and is represented by the relationship $s/R_{av}$, wherein $$s = \sqrt{\frac{\Sigma_i (R_i - R_{av})^2}{n - 1}}$$

$R_i$ = measured resistance of individual sample.
$R_{av}$ = calculated average resistance of all samples ($\Sigma_i R_i / n$)
n = number of samples
CV = s/R × 100 (%)

EXAMPLES

In the examples which follow, two glasses were used having the composition given in Table 1 below. Both glasses were made in accordance with the procedure given hereinabove.

TABLE 1

| Experimental Glass Compositions | | |
|---|---|---|
| Glass Designation | A | B |
| PbO | 50.1 | 55.9 |
| MnO | 6.5 | — |
| Al$_2$O$_3$ | 4.1 | 4.7 |
| B$_2$O$_3$ | 14.1 | 8.1 |

TABLE 1-continued

| Experimental Glass Compositions | | |
|---|---|---|
| Glass Designation | A | B |
| $SiO_2$ | 25.2 | 28.0 |
| $TiO_2$ | — | 3.3 |

EXAMPLES 1-3

Preparation of $Co_2RuO_4$

Three separate quantities of $Co_2RuO_4$ were prepared in the following manner:

Stoichiometric amounts of $Co_3O_4$ and $RuO_2$ powders were mixed and placed in an $Al_2O_3$ crucible, which was then heated in air for about 16 hours at 1000° C. The furnace was then turned off and allowed to cool down to room temperature. The solids were removed from the crucible and milled to yield finely divided particles having the properties given in Table 2 below:

TABLE 2

| | $Co_2RuO_4$ Properties | | |
|---|---|---|---|
| Example No. | 1 | 2 | 3 |
| Surface Area, m²/g | 2.69 | 3.02 | 3.33 |
| D-50, microns | 1.38 | 1.54 | 1.39 |

EXAMPLES 4-27

A series of 24 thick film compositions was prepared in the manner described hereinabove for the purpose of studying the various compositional parameters of the invention. Each of these thick film compositions was screen printed onto an alumina substrate and fired at 850° C. and the fired layers therefrom were tested with respect to resistance, coefficient of variance, and hot and cold TCR. The data from these tests are given in Table 3 which follows:

negative. The minimum resistance minimum is limited to ~87KΩ/ /mil. Examples 8-11 illustrate the effects of $Co_2RuO_4$ dilution by a glass consisting of a 1:1 mixture of glass A and glass B. In this system resistance increases with dilution and the TCRs are essentially not affected (Examples 8 and 9). Examples 4 to 11 show that resistances lower than ~87KΩ/ /mil with highly negative TCRs are not likely with the use of $Co_2RuO_4$ in the $Co_2RuO_4$-glass filler system. Examples 12-14 show that glasses can control the resistance for a fixed concentration of $Co_2RuO_4$ in that resistance increases with the increase of glass B ($TiO_2$-containing glass). However, the TCRs remain essentially the same.

Examples 15-18 illustrate the beneficial effects of $RuO_2$ in the system $Co_2RuO_4$-glass (A and B, fixed ratio of glass A to glass B was used) filler. The addition of $RuO_2$ decreases the resistance substantially but still maintains highly negative TCRs (Example 16). Further additions of $RuO_2$ (Example 17) lower the resistance and increases the TCRs. Examples 16 and 17 are blends between two end members of the series: Example 15 ($Co_2RuO_4$) and Example 18 ($RuO_2$). Although $RuO_2$ lowers the resistance and increases the TCR, it still results in wider range of useful R and TCR for thermistor applications. These beneficial effects of $RuO_2$ are further illustrated in the compositions of Examples 19-22 which span a wide resistance range of ~1KΩ/ to ~1MΩ/ , with highly negative TCRs. HTCR decreases with the increase in resistance, while the CTCR decreases more steeply with resistance. In the temperature range of −55° C. to room temperature (RT), the TCR is so negative that the compositions of Examples 20, 21 and 22 would be suitable for use as temperature-sensitive switches. The true nature of change in resistance as a function of temperature is averaged by the definition of CTCR, as follows:

TABLE 3

| Composition and Properties of Fired Thick Film Thermistors % Wt. | | | | | | | | | | | | |
|---|---|---|---|---|---|---|---|---|---|---|---|---|
| Example No.: | 4 | 5 | 6 | 7 | 8 | 9 | 10 | 11 | 12 | 13 | 14 | 15 |
| Composition | | | | | | | | | | | | |
| $Co_2RuO_4$ | 57.1 | 42.9 | 29.6 | 14.3 | 57.1 | 51.4 | 45.7 | 40.0 | 57.1 | 57.1 | 57.1 | 57.1 |
| $RuO_2$ | — | — | — | — | — | — | — | — | — | — | — | — |
| Glass A | 28.6 | 42.9 | 57.1 | 71.5 | 14.3 | 17.2 | 20.0 | 22.9 | 28.6 | 21.4 | 14.3 | 21.4 |
| Glass B | — | — | — | — | 14.3 | 17.2 | 20.0 | 22.9 | — | 7.1 | 14.3 | 7.1 |
| $SiO_2$ | 7.1 | 7.1 | 7.1 | 7.1 | 7.1 | 7.1 | 7.1 | 7.1 | 7.1 | 7.1 | 7.1 | 7.1 |
| $ZrSiO_4$ | 7.1 | 7.1 | 7.1 | 7.1 | 7.1 | 7.1 | 7.1 | 7.1 | 7.1 | 7.1 | 7.1 | 7.1 |
| Fired Properties | | | | | | | | | | | | |
| RΩ/ /mil | 184K | 86K | 235K | High | 946K | 1.5M | 6.1M | High | 184K | 492K | 946K | 492K |
| CV (%) | 5.4 | 15.2 | 13.5 | — | 5.2 | 6.4 | 6.4 | — | 5.4 | 6.5 | 5.2 | 6.5 |
| HTCR (ppm/°C.) | −9090 | −9589 | −7682 | — | −9172 | −9221 | — | — | −9090 | −9172 | −9121 | −9121 |
| CTCR (ppm/°C.) | −203K | −192K | −123K | — | −222K | −204K | — | — | −233K | −226K | −221K | −226K |
| Example No.: | 16 | 17 | 18 | 19 | 20 | 21 | 22 | 23 | 24 | 25 | 26 | 27 |
| Composition | | | | | | | | | | | | |
| $Co_2RuO_4$ | 42.9 | 28.6 | — | 38.1 | 44.6 | 52.0 | 57.1 | 38.1 | 36.2 | 34.3 | 30.5 | 22.8 |
| $RuO_2$ | 7.1 | 14.3 | 28.6 | 9.5 | 6.3 | 2.6 | — | 9.5 | 9.1 | 8.6 | 7.6 | 5.7 |
| Glass A | 26.8 | 31.2 | 42.9 | 28.6 | 26.1 | 23.4 | 14.3 | 28.6 | 30.4 | 32.2 | 35.7 | 42.8 |
| Glass B | 8.9 | 10.7 | 14.3 | 9.5 | 8.7 | 7.8 | 14.3 | 9.5 | 10.1 | 10.7 | 11.9 | 14.4 |
| $SiO_2$ | 7.1 | 7.1 | 7.1 | 7.1 | 7.1 | 7.1 | 7.1 | 7.1 | 7.1 | 7.1 | 7.1 | 7.1 |
| $ZrSiO_4$ | 7.1 | 7.1 | 7.1 | 7.1 | 7.1 | 7.1 | 7.1 | 7.1 | 7.1 | 7.1 | 7.1 | 7.1 |
| Fired Properties | | | | | | | | | | | | |
| RΩ/ /mil | 6.6K | 0.2K | 0.1K | 0.9K | 10K | 108K | 995K | 0.9K | 1.1K | 1.4K | 7.5K | 24.7K |
| CV (%) | 5.9 | 2.5 | 5.1 | 9.7 | 6.7 | 6.9 | 6.6 | 9.7 | 5.4 | 6.1 | 5.5 | 6.7 |
| HTCR (ppm/°C.) | −7581 | −1780 | −38 | −4751 | −8033 | −8988 | −9227 | −4751 | −4733 | −4656 | −4455 | −5384 |
| CTCR (ppm/°C.) | −66K | −1K | −0.1K | −6K | −120K | −244K | −267K | −6K | −7K | −8K | −9K | −23K |

Examples 4-11 illustrate the effects of $Co_2RuO_4$ dilution by glass A. Resistance is shown to be minimum around 43% wt. $Co_2RuO_4$ and then increases as expected. Both HTCR and CTCR become more highly $$CTCR = \frac{R_T - R_{Tref}}{R_{Tref}(T - T_{ref})} \cdot 10^6$$

where $T_{ref}$ is $R_T$ and T is $-60°$ C. The instantaneous $$TCR \left[ \frac{1}{R} \frac{dR}{dT} \right]$$

is smaller at lower temperature, due to the logaritmic change of resistance with temperature, that is where R is resistance at temp T, $R_o$ is resistance at reference temp, i.e., 0° C. or RT $\beta$ is thermistor constant.

Using the relation $TCR = -\beta/T^2$ at $-60°$ C., one estimates a $\beta$ of $\sim 11342$.

For some applications it is desirable to have a less negative CTCR. Examples 23-27 illustrate such compositions. 1K$\Omega$/ composition of Example 23 is diluted by a glass filler paste, which has the same wt. % ratios as in Example 23. The results of this dilution are shown in Examples 24 to 27 which illustrate a range of useful resistance and CTCRs which decrease with resistance in a moderate fashion. This is shown by comparison of Example 27 with Example 20. Example 20 has a resistance of 10K$\Omega$/ and CTCR of $-120K \pm 4.45K$ while Example 27 has a higher R of 24.7K$\Omega$/ and a larger CTCR of $-23K \pm 1.17K$.

What is claimed is:

1. A thick film resistor paste comprising an admixture of finely divided particles consisting essentially, based on the total weight of the solids, of:
   A. 20-60% weight of a conductive phase consisting essentially of:
      (1) at least one oxide of a platinum group metal having a positive TCR, and
      (2) $Co_2RuO_4$ in which the ratio of (1) to (2) is from 0.03 to 0.25;
   B. 75-20% weight of an inorganic binder having a softening point below 700° C., which is free of alkali metal oxides and contains 1-10 mole % oxide(s) of transition metals having atomic numbers 22 to 28, 41, 42 and 74;
   C. 5-20% weight fillers selected from vitreous silica, zircon and mixtures thereof;
   all of A, B and C being dispersed in:
   D. an organic medium.
2. The composition of claim 1 in which the inorganic binder is a lead aluminoborosilicate glass.
3. The composition of claim 1 in which the filler is a mixture of vitreous silica and zircon.
4. The composition of claim 1 in which the platinum group metal oxide is a ruthenium-based oxide.
5. The composition of claim 4 in which the ruthenium-based oxide is $RuO_2$.
6. The composition of claim 4 in which the ruthenium-based oxide is a pyrochlore-type compound.
7. The composition of claim 6 in which the pyrochlore-type compound is lead bismuth ruthenate.
8. The composition of claim 6 in which the inorganic binder has a Dilatometer softening point of below 600° C.

* * * * *